Patented Mar. 1, 1927.

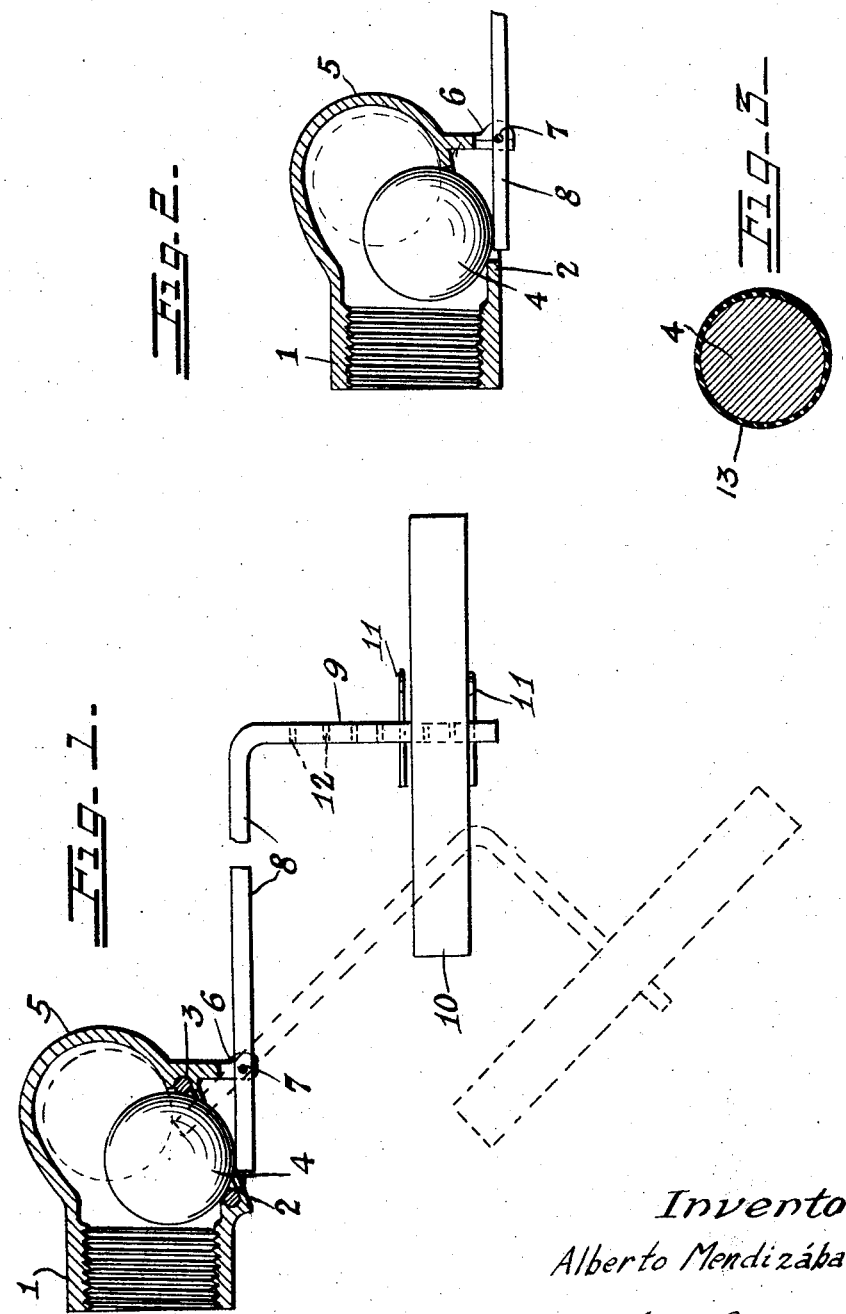

1,619,431

UNITED STATES PATENT OFFICE.

ALBERTO MENDIZÁBAL, OF BUENOS AIRES, ARGENTINA.

AUTOMATIC VALVE AND FLOAT FOR DRINKING TROUGHS AND THE LIKE.

Application filed May 12, 1926. Serial No. 108,593.

My present invention relates to automatic valves and floats for drinking troughs and the like and it has for its purpose to provide a simple, improved and very economical valve construction which works automatically to open and close a liquid supply passage.

In order that my present invention may be clearly understood and easily carried into practice, it is shown, by way of example, in the accompanying drawings, wherein, Figure 1 is a sectional view of the whole of the valve device and float.

Figure 2 is a similar view of a modified embodiment.

Fig. 3 is a central cross section through the ball shown in Fig. 2.

Similar characters of reference denote same or like parts throughout the said figures.

It is already known to use ball valves in connection with this class of devices, but the use thereof has entailed a series of disadvantages, particularly on account of the special construction given heretofore to the valve seat. In the known forms, said seat consists of a rubber ring or the like which is lodged within an independent metallic crown or ring, said metallic crown being then fixed or otherwise secured by suitable means to the outlet of the valve chamber. Said ring, during the working of the device, has to support all the pressure of the water or other liquid and at the moment of closing is submitted to a continuous hammering produced by the ball, as will be easily understood.

Apart from the mechanical and adjusting difficulties arising from the placing and securing of the said metallic ring, breaking or displacement of the ring cannot be avoided, in consequence of the hammering and pressure, and hence the valve is rendered inoperative and permits continuous outflow of liquid.

This disadvantage has been eliminated, according to my present invention, by making a cast chamber having an annular recess formed in the wall around the outlet opening of the valve chamber, a rubber ring being then introduced within the said lodging.

As may be seen from Figure 1 of the accompanying drawings, 1 is the inlet opening of the valve chamber, by which same is connected to the source of liquid and 2 the outlet opening in the wall around which a recess is formed for the rubber ring 3 on which normally rests the ball 4 which constitutes the valve proper. Said ball is fairly heavy and is held upon its seat by its own weight and by the pressure exerted thereupon by the head of the liquid, which enters and fills the said chamber.

In front of the outlet, said valve chamber has two ears 6 on which a lever 8 is pivoted at 7. Said lever supports the float.

Another of the main features of my present invention is the particular manner in which said float is supported. Said float is wooden and acts by its weight for the opening of the valve.

The float 10 is rigidly secured to the downwardly bent part 9 of the lever 8, and is secured at a suitable height by means of the bolts 11 or the like which are passed through openings 12 formed in the vertical part 9 of the lever. The short arm of the said lever acts upon the ball, raising it to the position shown in dotted lines, when the level of the liquid in the trough is lowered, and leaves said ball free to drop when said level is raised. It may be clearly seen from the drawings that the part 5 of the valve chamber, to which the ball 4 is carried on opening the valve, is out of line with the current of the liquid, which is a great advantage for the better utilization of the pressure and facilitates the closure. It will be also noted that the outlet opening is inclined with respect to the horizontal plane and this considerably facilitates the action of the lever, which is quicker and surer.

In Figures 2 and 3 a modified embodiment of the invention has been shown in which, instead of making the seat of the valve of resilient material, the ball 4 is made or covered with resilient material 13 and the seat is metallic. Like results may be obtained with this modified embodiment, although in practice it will be rather more costly on account of the material of the ball and the greater difficulty in compensating the wear.

I claim:

1. A valve and float for drinking troughs consisting of a valve chamber of cast iron having an inlet opening and an outlet opening, the latter provided with a recess in its wall, a rubber ring in said recess forming a seat, a heavy ball valve within said chamber normally resting upon said seat to close said outlet, the chamber having an extension out of line with the line of flow of the liquid, a lever pivoted to the said chamber and having one of its arms bent so as to extend downwardly, and a wooden float adjustable on said arm and adapted to be fixed thereto at a suitable height, said valve adapted to be moved by the other arm of the lever into said extension of the valve chamber when the downwardly bent arm of the lever is lowered in the trough.

2. A valve and float for drinking troughs and the like, consisting of a valve chamber having an inlet opening and an outlet opening, the latter forming a seat, a ball valve within said chamber normally resting upon said seat to close said outlet, said chamber also having an extension out of line with the line of flow of the liquid, a pivoted lever having one of its arms bent so as to extend downwardly, a float adjustable on said arm and adapted to be fixed thereto at a suitable height, and resilient packing material between the ball and the edge of the outlet opening, said valve adapted to be moved by the other arm of the lever into said extension of the valve chamber when the downwardly bent arm of the lever is lowered in the trough.

3. A valve and float according to claim 2, in which the outlet opening is disposed in a plane inclined to the horizontal.

In testimony whereof I affix my signature.

ALBERTO MENDIZÁBAL.